United States Patent Office 3,154,783
Patented Oct. 27, 1964

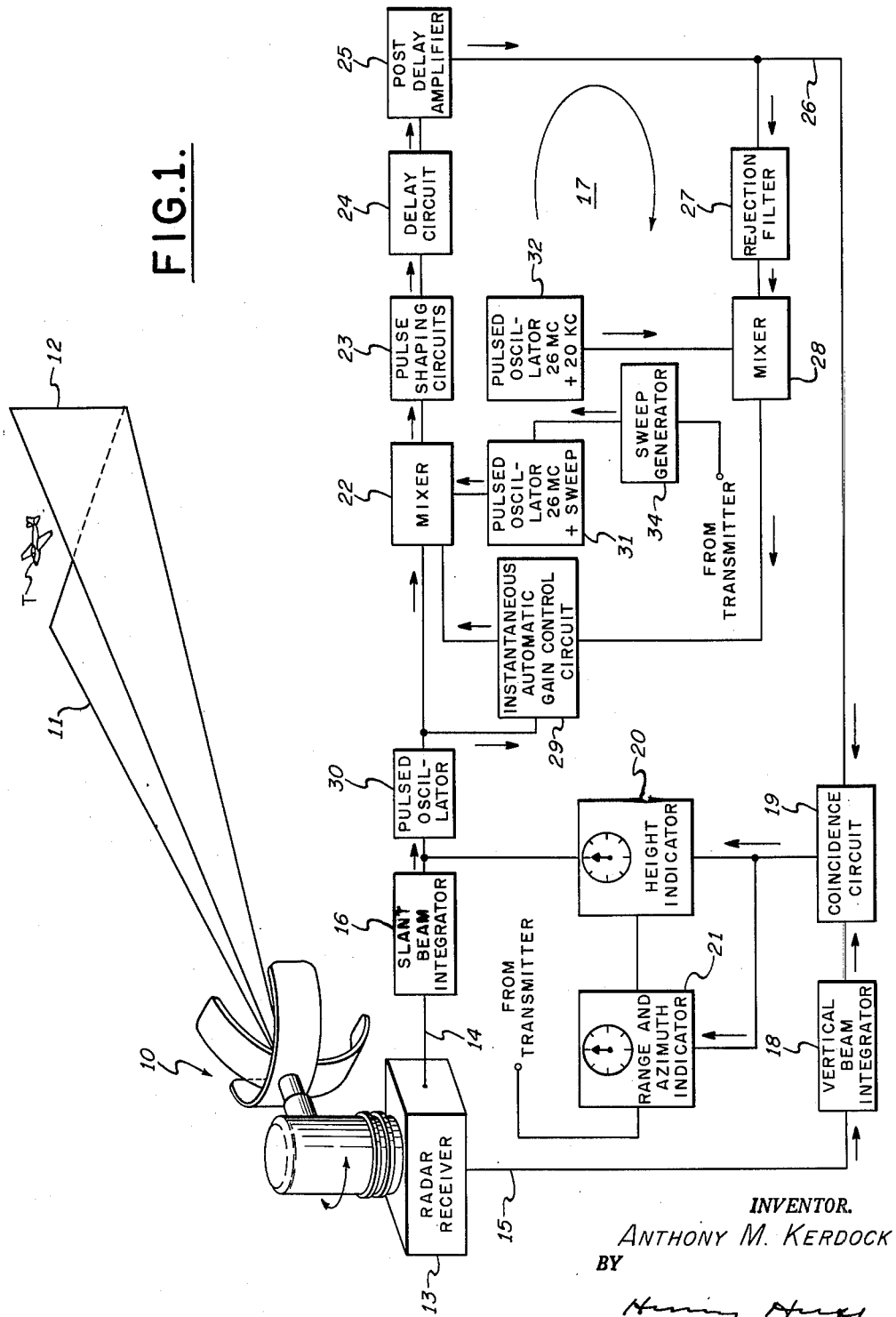

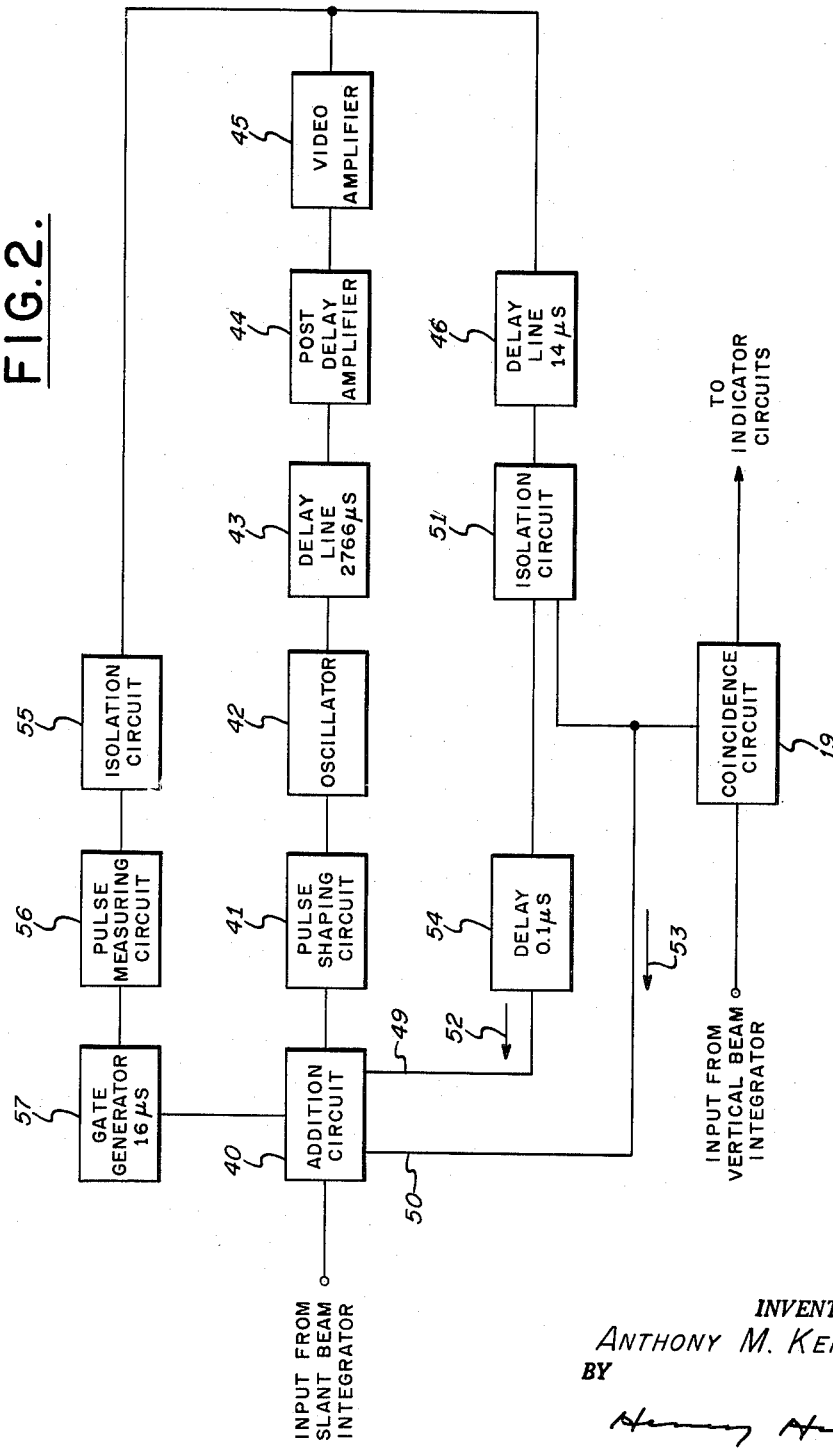

3,154,783
PULSE STORAGE SYSTEM
Anthony M. Kerdock, Brooklyn, N.Y., assignor to Sperry Rand Corporation, Great Neck, N.Y., a corporation of Delaware
Filed Jan. 26, 1961, Ser. No. 85,056
11 Claims. (Cl. 343—17.1)

This invention relates to electrical storage systems and more particularly it concerns an improved pulse signal delay device.

The storage of pulse signal information is generally accomplished by means of signal delay elements where short time storage is desired, or by means of counter-register type equipment for longer storage times. Unfortunately the economics of these two approaches do not overlap and for certain storage times the cost of either method becomes unduly high.

Recirculating signal delay loops provide a partial solution to this problem in that they serve as a relatively economical means for indefinitely increasing the delay period. However, to be effective such devices themselves require a counter in order to establish a period of delay and to cancel the recirculating pulse. Furthermore such devices are limited in that when a number of pulses are simultaneously recirculated the storage time for any pulse decreases since more counts are entered into the counter in a given time. Also, pulses introduced subsequent to an initial pulse will be delayed shorter periods of time as the output of most counters causes cancellation of all signals in the loop.

These general disadvantages become particularly significant where the delay device is used in conjunction with certain radar noise elimination schemes. Many radar systems discern true target echos from noise and extraneous returns by storing initially received signals and correlating them with signals which are subsequently received. For slowly scanning systems this correlation is performed on a pulse to pulse basis and requires relatively short delay times. But where the radar scan rate is high with respect to the transmitter pulse repetition rate, the correlation must be performed on a scan basis and requires much longer storage times. Also, in order to reduce possible concealment of targets which may be illuminated by the radar during the storage and correlation process, the storage system must be capable of simultaneously accommodating a number of recirculating pulses and individually cancelling or discarding each after a predetermined time.

It is an object of this invention therefore to provide a system which will reduce ambiguity caused by noise signals in a recurrently scanning radar system.

It is another object to provide a device which will ascertain correlation between signals in different sets of regularly recurring pulse trains.

A further object is to provide a device which preserves for predetermined lengths of time pulse position information with respect to a regularly recurring index.

A still further object of the invention is to provide a simple and easily adjustable means for individually storing pulse signals for discrete periods of time.

Briefly, these objects are accomplished by the provision of a recirculating signal delay loop having a total delay time equal to one pulse repetition period of the radar. Received signals representing possible targets are entered into the loop in pulse form and are recirculated until after the position in space which each represents is subsequently scanned. Should any subsequent signal indicating the range of a prior stored signal occur during this period it will correlate with the recirculating pulse to produce an output. The recirculating pulses are cancelled after being stored for a period of one scan by the provision in the delay loop of a means which incrementally changes a characteristic of each pulse for each recirculation. This characteristic, which may be for example, pulse width or pulse carrier frequency, is detected for each pulse and upon attaining a prescribed threshold its respective pulse is cancelled.

Referring now to the drawings:

FIG. 1 is a schematic illustrating a preferred embodiment of the invention; and

FIG. 2 is a schematic illustrating an alternative embodiment which for certain purposes may be a preferred embodiment.

The embodiment of FIG. 1 is shown as applied to a V-beam height finding radar. Such radars are characterized by a dual beam antenna pattern which resembles a trough extending from the antenna and which has a modified V-shaped cross section. As the antenna scans in azimuth the height of a target is a function of the length of time between the target returns received along each of the two antenna beams. Range and azimuth information are obtained in conventional manner.

The present embodiment includes an antenna 10 which generates a dual antenna pattern consisting of a slant beam 11 and a vertical beam 12. The antenna is connected to a radar receiver 13 which detects information received on the two beams and generates video signals on corresponding output lines 14 and 15 known as the slant beam output and the vertical beam output respectively. Signals from the slant beam output 14 are integrated in a slant beam integrator 16 and stored in a recirculating delay loop 17 where they are made available for a certain length of time for possible correlation with future signals from the same target which may be received along the vertical beam 12. Signals from the vertical beam output 15 are integrated in a vertical beam integrator 18 and applied to a coincidence circuit 19 where they are compared with stored signals from the recirculating delay loop 17. Those signals which correlate in the coincidence circuit are applied to a height indicator 20 where the time difference between the signals received on the two beams is determined and the corresponding target height is presented. The correlated signals are also applied to a range and azimuth indicator 21 which visually presents this information.

The recirculating delay loop 17 includes a first frequency mixing circuit 22 followed by a pulse shaping circuit 23, a delay line 24 and a post delay amplifier 25. Outputs from the post delay amplifier are applied via an output line 26 to the coincidence circuit 19. The loop continues from the output of the post delay amplifier, through a rejection filter 27, a second frequency mixing circuit 28, and an instantaneous automatic gain control circuit 29, to the first frequency mixing circuit 22. Input signals from the slant beam integrator 16 are applied to the first mixing circuit 22 via a pulsed oscillator 30 which produces 40 megacycle oscillations for a period of 2 microseconds when excited by a pulse from the integrator.

First and second local oscillators 31 and 32, which produce output frequencies of 26 megacycles and 26 megacycles plus 20 kilocycles respectively, each supply one of the frequency mixing circuits.

The pulse shaping circuit 23 includes threshold and limiting circuits. Its purpose is to provide each recirculating pulse with a uniform square wave envelope to ensure accuracy throughout the storage process.

The delay line 24 retards each pulse for a period of 2780 microseconds, giving the loop a total pulse recirculation period equal to the radar transmitter pulse repetition period. Thus the pulse position information, which corresponds to possible targets at particular ranges, is preserved during the entire storage time.

The post delay amplifier 25 has a gain characteristic sufficient to maintain a total loop gain of approximately unity. This permits the desired pulse to be continually recirculated at a substantially constant amplitude.

The rejection filter 27 is capable of passing signal frequencies less than 16 megacycles and rejecting all higher frequencies. The purpose of the filter is to reject unwanted sideband outputs from the first frequency mixing circuit and to limit the number of times which each pulse recirculates.

The instantaneous automatic gain control circuit 29 is actuated by inputs from the slant beam integrator 16. Its function is to reject any recirculating signal which may be passing through it while a new signal is being applied from the integrator 16. This additional feature permits the storage time to be increased when the slant beam illuminates a second possible target at the same range as a prior detected target.

During operation of the system, the antenna 10 scans in azimuth while transmitter interrogation pulses are simultaneously transmitted along each of the two antenna beams. A target T is first illuminated by the slant beam 11 and reflects echo signals along that beam to the radar receiver 13. The echo signals as well as noise and extraneous returns are detected in the receiver and are applied via the slant beam output 14 to the slant beam integrator 16. A pulse to pulse correlation process is performed in the integrator and certain of the noise and extraneous returns are rejected. The resolution or accuracy of the correlation process, however, is limited by the number of successive transmitter pulses incident upon the target during a scan, which in turn is limited by the thinness of each beam and the antenna scan rate with respect to the transmitter pulse repetition rate. Therefore in order to ensure that no real targets are rejected by the integrator, it is necessary that the acceptance threshold of the integrator be set to a point where a certain number of non-target signals are passed with the real target returns.

The pulse outputs from the slant beam integrator represent possible targets whose range is indicated by the position in time of each pulse with respect to the next preceding transmitter pulse. These pulses are stored in the recirculating delay loop 17 for a period of time sufficient to allow the target to be illuminated subsequently by the vertical beam 12. The delay loop 17 has a recirculation period equal to the pulse repetition period of the radar transmitter (not shown). The position of a pulse in the loop with respect to its next preceding transmitter pulse will thus be preserved during the entire storage time. This pulse will then appear on the loop output line 26 at the coincidence circuit 19 at a time after every transmitter pulse which corresponds to the range of the possible target it represents.

Echo signals received along the vertical beam 12 are detected in the receiver and are correlated in the vertical beam integrator 18 on a pulse to pulse basis as in the slant beam integrator. The correlated output pulses from the vertical beam integrator, whose positions in time with respect to the next preceding transmitter pulse also represent possible targets at particular ranges, are applied to the coincidence circuit 19. The coincidence circuit will pass any pulse from the vertical beam integrator which coincides in time with a pulse from the recirculating delay loop 17. Thus whenever a possible target appears at the same range on both beams a signal will be passed through the coincidence circuit to the indicator circuits 20 and 21 where a visual presentation is made.

The recirculating delay loop 17 operates in the following manner. A pulse representing a possible target at a discrete range is supplied from the output of the slant beam integrator 16 and triggers the pulsed oscillator 30 which produces two microseconds of 40 megacycle oscillations. These oscillations are heterodyned in the first frequency mixing circuit 22 with the 26 megacycle output of the first local oscillator 31. The pulsed oscillations from the frequency mixing circuit are then given a sharply defined square wave envelope in the pulse shaping circuit 23. The pulse is retarded in the delay line 24 by a length of time equal to the transmitter pulse repetition period and then amplified in the post delay amplifier 25. Upon amplification the pulse is supplied via the loop output line 26 to the coincidence circuit 19 for possible correlation with a signal from the vertical beam integrator 18. It is also passed through a selective bandpass filter 27 which rejects all frequencies over 16 megacycles. Here the higher sideband frequency components from the first frequency mixing circuit 22 are eliminated and only the 14 megacycle component is retained. This frequency component is then heterodyned in the second frequency mixing circuit 28 with the 26 megacycle plus 20 kilocycle output of the second local oscillator 32 and passed through the instantaneous automatic gain control circuit 29. The higher sideband output of the frequency mixing circuit, i.e., 40 megacycles plus 20 kilocycles is passed in the gain control circuit while the lower sideband is suppressed. Thus the pulse is seen to have increased in frequency by 20 kilocycles for one circulation through the delay loop. The pulse is again applied to the first frequency mixing circuit 22 and recirculated through the loop.

After every recirculation each pulse increases in frequency by 20 kilocycles. After one hundred recirculations a pulse will have increased in frequency by 2 megacycles, and the output of the first frequency mixing circuit 22 will then have a lower frequency sideband component of 16 megacycles which is the pass limit of the rejection filter 27. The filter will then cancel the entire pulse upon its next following circulation. The length of time necessary for a pulse to recirculate 100 times through the delay loop is sufficient to allow the vertical antenna beam 12 to completely illuminate the same position in space which the slant beam 11 had illuminated when the pulse was generated. By cancelling the pulse in the loop after this period of time the possibility of recording a non-target return which may subsequently be detected from the vertical beam is greatly reduced.

The instantaneous automatic gain control 29 suppresses any recirculating pulse whose position in time with respect to a transmitter pulse is the same as a subsequent pulse input from the slant beam integrator. This is accomplished by applying each subsequent pulse input to the gain control circuit 29. The gain in that portion of the loop becomes, for the duration of the subsequent pulse, sufficiently small to suppress any signals passing through the circuit at that time. Meanwhile the subsequent pulse is also applied to the loop by means of the oscillator 30. In this manner the recirculating pulse, which may have had less than 100 recirculations remaining, is replaced at the same range position by a fresh pulse which will remain in the loop for an additional 100 recirculations. This arrangement allows the system to detect a plurality of targets which may be relatively close in azimuth and at the same range. It also ensures the presentation of a real target even if a non-target return precedes it in the slant beam 11 at the same range. It is to be noted that each pulse in the delay loop is recirculated the same number of times, i.e., 100 times in the present embodiment. For certain applications it may be desired to discriminate between pulses as to the length of their respective storage times. Such a feature would be useful, for example, in the present embodiment. In V-beam type radars, the angle through which the antennas must scan in order to illuminate a target with both beams, depends upon both the height and the range of the target. For targets at a given height this scan angle decreases with increasing range. Consequently it is not necessary to store signals representing distant targets as great a time as it is for signals representing closer targets.

The present system is easily adaptable to such a storage technique. This is accomplished as shown in FIG. 1 by the use of a sweep generator 34 synchronized to begin a rising voltage sweep with each transmitter pulse. The voltage output from the sweep generator would be applied to one of the local oscillators in the loop and would cause proportional tuning of the oscillator. The frequency of a recirculating pulse increases for each recirculation by the difference in frequencies of the two local oscillators during the times the pulse passes through their respective frequency mixing circuits. Thus it can be seen that by application of a sweep tuning voltage to the first oscillator 31, stored pulses which represent shorter ranges are changed only slightly in frequency for each recirculation, while pulses representing longer ranges will be increased a greater amount in frequency upon each recirculation. Consequently those pulses representing the shorter ranges will be stored for greater lengths of time. This eliminates unnecessary storage of pulses in the delay loop which in turn reduces the possibility of non-target presentations on the radar indicators 20 and 21.

A second possible method for discriminating between the delay times for various pulses would be to control the frequency of the pulsed oscillator 30 as each input signal is applied. Thus for signals to be stored for a longer time, the pulsed oscillator would be tuned to a lower frequency; while for signals to be stored a shorter time, it would be tuned to a higher frequency.

The present embodiment shows a rejection filter 27 as a means for cancelling the recirculating pulse after a predetermined number of recirculations. It is to be noted that the filter causes a premature cancellation of the recirculating pulses. That is, the delay loop would be capable of recirculating the pulses a much greater number of times. The limitation upon the natural capacity of the delay loop is set by the frequencies of the two local oscillators and the necessary sideband suppressing elements following each frequency mixing circuit. It has been found that where a filter or frequency selective amplifier which will pass only those frequencies which are less than the initial higher sideband output of one of the frequency mixing circuits is placed at the output of that circuit, and a second frequency selective device capable of passing only signals having frequencies greater than the initial lower sideband output of the other frequency mixing circuit is placed at the output of that circuit, a maximum number of recirculations can be obtained for any pulse. The number of recirculations in this case will be equal to twice the frequency of the lower frequency local oscillator divided by the difference in frequency between the two local oscillators.

An alternate embodiment of the recirculating delay loop is shown in FIG. 2. In this embodiment a pulse being recirculated in the loop is widened incrementally upon each recirculation. A pulse width measuring circuit generates a signal upon the occurrence of a pulse which exceeds a width of 12 microseconds. This signal is then used to cancel the pulse.

The system includes a delay loop and a pulse cancellation loop. The delay loop comprises: a signal addition device 40, a pulse shaping network 41, an oscillator 42, a first delay line 43, a post delay amplifier 44, a video amplification circuit 45, a second delay line 46 and a pulse stretching network. The signal addition device 40 is essentially an "or" circuit which produces an output in response to signals on one or more of three input lines 48, 49 and 50. The pulse shaping network 41 includes threshold and limiter circuits which convert output pulses from the signal addition device 40 to a uniform height. The oscillator 42 is modulated by the output of the pulse shaping network 41 to produce high frequency pulses. The first delay line 43 retards these pulses by 2766 microseconds which is somewhat less than the pulse repetition period of the radar transmitter. The signals are amplified in the post delay amplifier 44 which is set to achieve a total loop gain of approximately unity. The video amplifier 45 operates to detect the envelope on the delayed pulse. The envelope is applied to the second delay line 46 which has a delay time of 14 microseconds. This provides a total loop delay equal to the pulse repetition period of the radar transmitter. The reason for two delay stages in this scheme will become apparent as the pulse cancelling portion of the loop is described. The pulse stretching network includes an isolation circuit 51 which applies the pulse simultaneously to parallel transmission paths 52 and 53 which are each applied as two of the individual inputs 49 and 50 to the signal addition device 40. A .1 microsecond delay line 54 is included in one of the transmission paths.

The pulse cancellation loop includes a portion of the delay loop plus a signal isolation circuit 55, connected to the video amplifier circuit 45, a 12 microsecond pulse measuring circuit 56, and a 16 microsecond gate generator 57, connected to the signal addition device 40.

The system operates in the following manner. Signals to be stored, as for example pulses from the slant beam integrator 16, are applied to one of the signal addition device inputs 48. In the present case these pulses have widths of 2 microseconds each. Each pulse passes through the device to the pulse shaping network 41 where it is given a predetermined height and used to modulate the oscillator 42. The pulse is then delayed for 2766 microseconds in the first delay line 43, amplified in the post delay amplifier 44, and detected in the video amplification circuit 45. The pulse is then simultaneously applied to the 12 microsecond pulse measuring circuit 56 in the pulse cancellation loop and to the 14 microsecond delay line 46 in the delay loop. Since the pulse is less than 12 microseconds in width it terminates at this point in the pulse cancellation loop. In the delay loop however, it is delayed for an additional 14 microseconds in the second delay line 46 and then is applied simultaneously to the two transmission paths 52 and 53. The pulse then proceeds via each of the two transmission path inputs 49 and 50, to the signal addition device 40.

Because of the .1 microsecond delay in one of the paths, the total length of time that signals appear on the two addition device inputs is 2.1 microseconds. Thus the output of the device will have increased in width by .1 microseconds for one recirculation of the pulse. This output is again applied to the threshold and limiter circuits which give it a uniform height. It is then recirculated, increasing in width by .1 microseconds for each recirculation.

After 100 recirculations the pulse achieves a width of 12 microseconds. During the one hundredth recirculation, the pulse upon being applied to the pulse measuring circuit 56, produces an output from the measuring circuit which triggers the 16 microsecond gate generator 57. The gate generator during this time provides a bias to the signal addition device 40 which prevents any output from that device, thus effectively cancelling the recirculating pulse in the delay loop.

An output 58 is taken from one of the parallel signal transmission paths and applied to a coincidence circuit 59 for possible correlation with input signals on another input line 60 which may be the output of the vertical beam integrator 18.

While the invention has been described in its preferred embodiments, it is understood that the words which have been used are words of description rather than of limitation and that changes within the purview of the appended claims may be made without departing from the true scope and spirit of the invention in its broader aspects.

What is claimed is:

1. A device for comparing pulse position information with respect to a regularly recurring index in two sets of pulse trains comprising a recirculating signal delay loop having a delay time equal to an aliquot part of the period of recurrence of said index, means for generating electrical oscillations of an initial frequency in response to the pulses in one set of said pulse trains, means for introducing said oscillations into said loop, said loop including means for incrementally changing the frequency of said oscillations by a predetermined amount upon traversing a point in said loop, means for cancelling said oscillations upon their attaining a second predetermined frequency, and coincidence means responsive to a coincidence between any signal in said loop and a signal in the second of said pulse trains.

2. The device described in claim 1 wherein said means for incrementally changing the frequency of said oscillations comprises two frequency mixing elements in said loop, each of said frequency mixing elements having an associated oscillator tuned to a discrete frequency and frequency selective signal suppression means alternate with said frequency mixing elements in said loop for cancelling undesired frequency sidebands from said loop.

3. The device described in claim 1 wherein said means for cancelling said oscillations comprises a further frequency selective signal suppression means in said loop.

4. A device for determining correlation between signals in two separate sets of regularly recurring pulse trains, said device comprising a signal delay loop for recirculating a signal a predetermined number of times, means for introducing pulsed oscillations into said loop in response to signals from the first of said sets of pulse trains, said loop including two frequency mixing elements, each of said elements having an associated fixed frequency generator supplying a discrete frequency of a value such that one half the difference between the frequencies of said generators is wholly dividable into the lesser of said frequencies by a number of times which is at least as great as said predetermined number of times, and frequency selective signal suppression means alternate with said mixing elements for cancelling undesired frequency sidebands at the output of each of said frequency mixing elements, and coincidence means responsive to a coincidence between any signal traversing a point in said loop and a signal in the second set of said pulse trains.

5. The device described in claim 4 wherein said frequency selective signal suppression means include a first filter selective to pass signals having frequencies less than the initial higher sideband output of one of said frequency mixing elements and a second filter selective to pass signals having frequencies greater than the initial lower sideband output of the other of said frequency mixing elements.

6. The device as in claim 5 and further including further filter means for cancelling said recirculating pulse after a number of recirculations less than the natural limits of said loop.

7. A device for recirculating a pulse signal a desired number of times, said device comprising a recirculating signal delay loop and means for introducing said pulse signal into said loop, said loop including pulse widening means for cumulatively increasing the width of said pulse by a prescribed amount for each recirculation of said pulse, and discrimination means responsive to a predetermined value of pulse width to produce a cancellation of said recirculating pulse.

8. The device described in claim 7 wherein said pulse widening means comprises first and second signal transmission paths having shorter and longer signal delay characteristics respectively, means for introducing a pulse from said loop simultaneously into each of said paths, and means for producing an output pulse initiated by the output of said first transmission path and terminated by the output of said second transmission path.

9. Means for determining correlation between signals in two separate sets of regularly recurring pulse trains, said means comprising a recirculating signal delay loop having a total delay equal to the period of one train, said delay loop including signal delay means, input means for applying the signals of only one of said sets to the loop, alteration means for cumulatively changing a characteristic of each of the signals of said one set as each signal traverses a point in said loop, means responsive to a predetermined value of said characteristic to cancel its respective signal, and coincidence means responsive to a coincidence between any signal traversing a second point in said loop and a signal in the other set of pulse trains to produce an output signal.

10. A device for reducing noise signals in a recurrently scanning radar, said device comprising first means for receiving echo signals in response to a first scan of said radar, second means for receiving echo signals in response to a subsequent scan of said radar, a recirculating signal delay loop having a delay time equal to the pulse repetition period of said radar, means for introducing signals from said first means into said loop, said loop including a means for cumulatively changing a characteristic of each recirculating signal in said loop, means responsive to a predetermined value of said characteristic to cancel its respective signal, the amount of said cumulative change and said predetermined value being such that each stored signal recirculates for a time at least as long as the time between recurrent scans of said radar, and means responsive to the coincidence between signals from said second means and each recirculating signal in said delay loop to produce an output signal.

11. A device for reducing noise signals in a recurrently scanning V beam radar, said device comprising first means for receiving echo signals from the slant beam of said radar, second means for receiving subsequent echo signals from the vertical beam of said radar, a recirculating signal delay loop having a delay time equal to the pulse repetition period of said radar, means for introducing signals from said first means into said loop, said loop including means for cumulatively changing a characteristic of each recirculating signal in said loop, means responsive to a predetermined value of said characteristic to cancel its respective signal, the amount of said cumulative change and said predetermined value being such that each stored signal recirculates for a time at least as long as the time between recurrent scans of said radar, and means responsive to the coincidence between signals from said second means and each recirculating signal in said delay loop to produce an output signal.

References Cited in the file of this patent

UNITED STATES PATENTS

| | | |
|---|---|---|
| 2,736,021 | Sunstein | Feb. 21, 1956 |
| 2,770,722 | Arams | Nov. 13, 1956 |
| 2,806,997 | Carbrey | Sept. 17, 1957 |
| 2,885,590 | Fuller | May 5, 1959 |
| 2,920,289 | Meyer | Jan. 5, 1960 |